3,449,668
PORTABLE STATIC METER FOR DETERMINING THE MAGNITUDE AND POLARITY OF ACCUMULATED ELECTROSTATIC CHARGES
Lyman L. Blackwell and Edward T. Able, Denver, Colo., assignors to B. K. Sweeney Manufacturing Co., Denver, Colo.
Filed Mar. 15, 1965, Ser. No. 439,865
Int. Cl. G01r *31/02, 5/28*
U.S. Cl. 324—72                            7 Claims

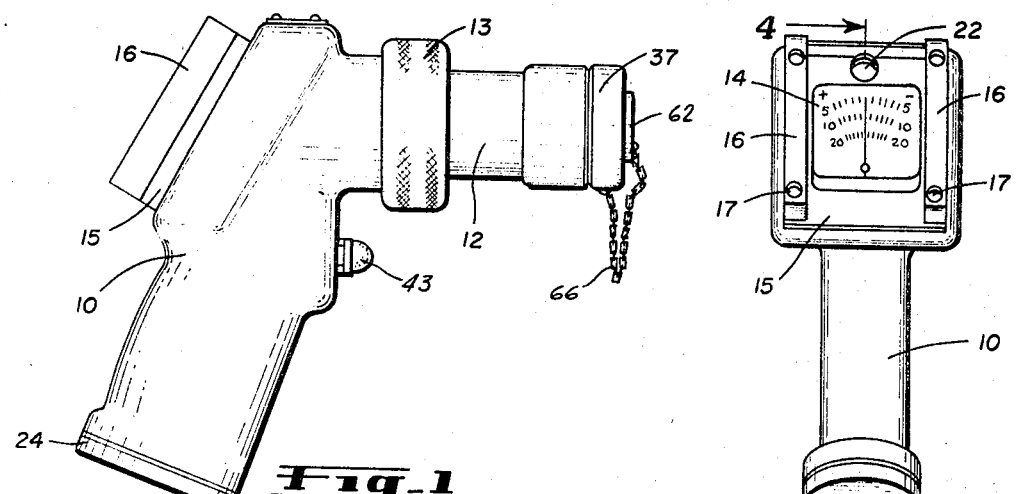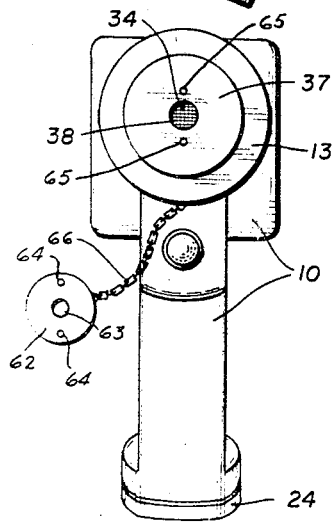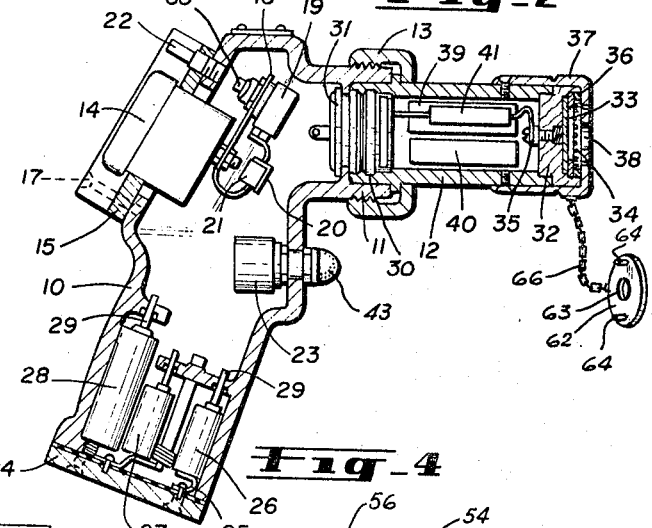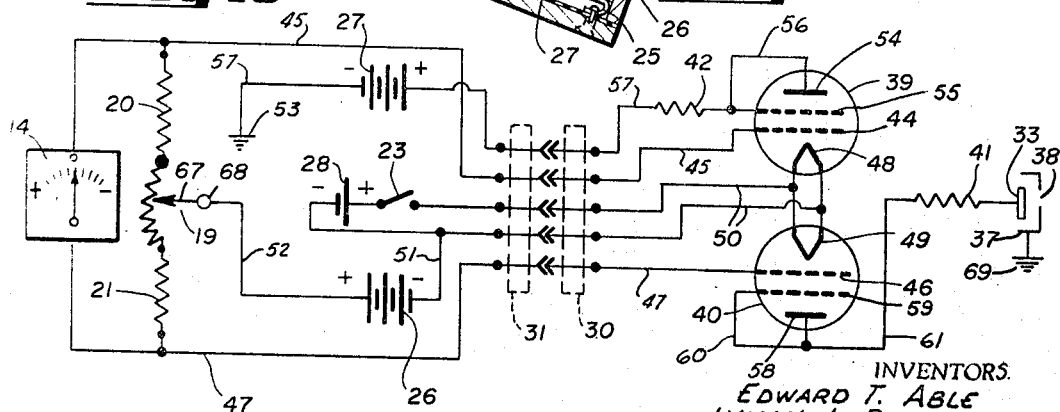
Fig. 1
Fig. 2
Fig. 3
Fig. 4
Fig. 5
INVENTORS.
EDWARD T. ABLE
LYMAN L. BLACKWELL
BY
ATTORNEY

United States Patent Office 3,449,668
Patented June 10, 1969

ABSTRACT OF THE DISCLOSURE

A portable metallic housing provided with a static-sensing disc of a radio-active isotope, such as tritiated titanium foil, and containing electronic circuitry including: two triode electronic tubes, a polarity-indicating volt meter, two bias batteries and a potential-balancing circuit for bringing the voltmeter to zero when no external static charge is impinging upon the static-sensing disc so that when the latter is brought into proximity to a subject having an external static charge the voltmeter will be actuated to indicate the voltage and polarity of the static charge of the subject.

---

This invention relates to a detector for detecting and measuring electrostatic voltages and has for its principal object the provision of a convenient, self-contained, portable static meter which will detect and quantitatively measure electrostatic charges wherever such charges accumulate without it being necessary to contact the suspected surface or product.

The invention will find application in the detection of static troubles in processes and machines handling dielectric sheet materials such as printing presses, textile machines, etc. and in checking the efficiency of present electrostatic neutralizers.

It will also be found useful in monitoring hazardous areas where combustible dust accumulations, and the like, could build up sufficient electrostatic voltage to cause damaging ignition discharges.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a side elevational view of the improved static meter;

FIG. 2 is a rear view thereof;

FIG. 3 is a front view thereof;

FIG. 4 is a medial, vertical, longitudinal section through the meter taken on the line 4—4, FIG. 2, with the electrical conductors omitted and with the various circuit elements shown in block form; and FIG. 5 is a diagram of the electrical circuits employed in the static meter.

The improved self-contained, portable static meter of this invention employs a hollow metallic housing 10 having a "pistol grip" shape so that it may be grasped in the palm of the hand and provided with a forwardly-extending, threaded nipple 11 into which a tubular, metallic, sensing-element-barrel 12 is clamped by means of an annular retaining nut 13. The upper rear portion of the housing is open to receive a voltmeter 14, of the two-terminal-polarity-indicating type, which is mounted in a suitable face plate 15. The face plate is provided with a guard rail 16 at each of its sides to protect the voltmeter 14 and the face plate 15 is clamped against the housing by means of suitable clamp screws 17 which pass through the rails 16 and are threaded into the housing.

An insulating mounting board 18 is mounted on the enclosure of the meter 14 to support a zeroing potentiometer 19 having a wiping contact 67 adjustable by a control shaft 68, and two preset resistors 20 and 21 within the housing. The elements 18, 19, 20 and 21 can all be removed or replaced as a unit with the meter 14 by simply removing the clamp screws 17. The face plate 15 is provided with a conventional adjusting knob 22 which can be pushed into engagement with the control shaft 68 of the potentiometer 19 to adjust the latter.

A push-button switch 23 is mounted on the inside of the front of the housing with its button projecting forwardly into a compressible rubber cap 43 which prevents the entrance of moisture and acts as a trigger for the push button. The bottom of the housing is closed by a removable cover 24 provided with internal spring contacts 25 which are insulated from the cover 24 and which close circuits to two fifteen volt mercury bias batteries 26 and 27, such as Mallory RM411R, and one 1.34 volt mercury filament battery 28, such as Mallory RM12R. The batteries are pressed against spring terminals 29 in the housing to complete circuits to be later described.

A multiple-prong, terminal plug 30 closes the inner extremity of the barrel 12. The prongs of the plug 30 engage in a multiple-socket receiving-element 31, which is fixedly mounted in the threaded nipple 11, to connect the circuits of the sensing elements in the barrel 12 to the elements in the housing 10. The outer extremity of the barrel 12 is closed by an insulating disc 32 the forward face of which is provided with a cavity in which a sensing disc 33 is inserted. The sensing disc comprises a metallic disc the forward face of which is covered with a radio-active isotope (H3) such as tritium (tritiated titanium) foil which is protected from mechanical injury by a circular metallic screen 34 which is also positioned in the cavity of the insulating disc 32 forwardly of the sensing disc 33. A concentric spring contact 35 extends through the insulating disc 32 and makes constant resilient electrical contact with the sensing disc 33 and its radio-active isotope. An annular insulating spacer 36 maintains the sensing disc and its protective screen in the cavity of the insulating disc and a covering orifice cap 37 is telescopically fitted over the forward extremity of the barrel to maintain the sensing elements in place in the barrel. The cap is provided with an electron opening 38 of calibrated size for exposure of the sensing disc. The barrel 12 provides a housing for two triode electronic tubes 39 and 40 and two 22 meg. current limiting resistors 41 and 42 which are connected to contacts on the terminal plug 30 and to the concentric spring contact 35 of the sensing disc 33, as shown in the circuit diagram of FIG. 5.

Referring to the diagram of FIG. 5 it will be noted that the filament grid of the first triode tube 39, indicated at 44, is connected to one terminal of the voltmeter 14 by means of a first meter conductor 45 and the filament grid of the second triode tube 40, indicated at 46, is connected to the other voltmeter terminal by means of a second meter conductor 47. The terminals of the resistance element of the potentiometer 19 are connected in series between the preset resistors 20 and 21 and the latter three elements form a bridge between the meter conductors 45 and 46 so that voltage flowing to the meter can be by the potentiometer 19 balanced, when desired, to produce a zero indication thereon. The filaments of the two tubes 39 and 40, indicated at 48 and 49, respectively, are connected in parallel and are simultaneously supplied with current from the filament battery 28 through the push button switch 23 and through filament leads 50. The negative terminal of the battery 26 is connected to the negative filament lead 50, as indicated at 51, to negatively charge the cathodes or filaments 48 and 49. The positive terminal of the first bias battery 26 is connected, as indicated at 52, to the wiping brush contact 67 of the potentiometer 19 to controllably supply positive current to the grids 44 and 46. The negative terminal of the second bias battery 27 is grounded to the housing 10, as indicated at 53. The plate 54 of the tube 39 is connected to the plate grid 55 of that tube to form a double positive plate screen-grid combination 56. The positive terminal of battery 27 is connected to the combination 56, through the resistor 42, by means of a first plate conductor 57.

The plate 58 of the tube 40 is similarly connected to the plate grid 59 of that tube to form a double positive plate-screen-grid combination 60 which is connected, by means of a second plate conductor 61, through the resistor 41, to the sensing disc 33. The orifice cap 37 is grounded to the metallic housing 10 as indicated at 69.

The principle of operation is based on the circuit characteristics of an inverted tube. A zero potential connected to the plate and screen grid of a tube, connected in an inverted manner, gives a maximum control grid current flow when there is zero potential difference between the plate screen grid combination and the filament. As the plate of an inverted tube goes negative it tends to repel the current flow or electron flow causing a decrease in control grid current flow. This invention is based on two of these tubes connected in an inverted manner acting as a gating circuit for the current flow through the bridge circuit.

Zero balance is obtained by shorting the disc 33 to the housing. This may be accomplished by touching the disc 33 with one hand while holding the housing in the other hand. At point of zero balance, the first tube 39 has its plate screen biased positive with respect to the filament by the battery 27. The tube 39 therefore conducts and represents a low resistance path to the filaments 48 and 49. The filament of the second tube 40 is connected to the positive of the battery 27 through the tube 39. The plate screen combination 56 of the tube 39 is connected to the negative side of the battery 27 through the resistor 41, the sensing disc 33 and the user's hand short to the housing 10. The resulting negative plate-to-cathode voltage applied to the tube 39 causes the tube to function as an inverted tube. In this inverted function, the filament-plate-screen current of the tube 40 is biased into non-conduction and the filament grid 46-to-filament 49 current is a function of the cathode-plate-screen voltage. The grid-to-filament current flows from the filament 49 to the grid 46 thence through the resistor 21 and the potentiometer 19 to the positive side of the battery 26 thence back to the filament 49. For the circuit to zero with the potentiometer wiping contact 67 set at the midpoint, as indicated in FIG. 5, the resistors 21 and 20 must be preset at predetermined unequal ohmage.

Once the circuit has been balanced, the operation is as follows: tube 39 normally functions as a conventional tube giving a maximum current flow due to its positive biased plate combination 56. Tube 40 acts as an inverted tube. The grid current flow of tube 40 will decrease or increase in direct proportion as the voltage on its plate combination 56 goes negative or positive.

The filament 49 of tube 40 is connected to ground through the low resistance plate screen combination 60 of tube 39. The plate current of tube 39 is very small, as in all cases the plate voltage is very small because the supply voltage is in series with the inverted tube arrangement of tube 40. Better than 99% of the applied voltage is dropped across tube 40 because of its extreme high input resistance ($10^{14}$ ohms).

At any time there is any change in the potential difference between the plate combinations of the tubes 39 and 40, the output of the bridge will unbalance in direct proportion to the amplitude of the input differential voltage.

Should the atmospheric input voltage (positive on 33, negative on ground) exceed the 14 volt bias voltage, the tube 39 will then function in an inverted manner and tube 40 will conduct. This dual function assures the circuit is always operating in an electrostatic manner regardless of the polarity and amplitude of the input voltage.

The radio active isotope on the sensing disc 33 ionizes the air in the orifice cap 37 to produce a low resistance contact to the charged ions in the air and result in a current flow to the plate-screen-grid combination 60 of the tube 40 which reflects on the voltmeter 14, both the polarity and amplitude of the atmospheric charge in direct proportion to the size of the electron opening 38.

The size of the electron opening 38 can be reduced to multiply the meter reading by placing a multiplying plate 62 having a reduced orifice 63 on the front of the orifice cap 37. The reduced orifice plate 62 can be removably mounted in any desired manner such as by means of dowel pins 64 which enter dowel holes 65 in the orifice cap 37. For convenience and availability, the multiplying plate 62 is preferably suspended from the cap 37 by means of a suitable suspension chain 66. Resistors 41 and 42 limit the current which can be delivered to the sensing disc 33 in case of a short between the plate screen and grid or filament in either tube.

While a specific form of the invention has been described and illustrated herein, it is to be understood that the same may be varied within the scope of the appended claims, without departing from the spirit of the invention.

Having thus described the invention, what is claimed and desired to be secured by Letters Patent is:

1. A portable static meter including:
   - (a) a polarity and amplitude indicating voltmeter;
   - (b) a radio-active sensing element;
   - (c) a grounded cap element adjacent and insulated from said sensing element and having an electron orifice exposing said sensing element to the atmosphere;
   - (d) a first electron discharge tube;
   - (e) a second electron discharge tube, each of said tubes having a cathode, an anode and a control grid;
   - (f) a first meter conductor electrically connected between the control grid of the first tube and a terminal of said voltmeter;
   - (g) a second meter conductor electrically connected between the control grid of the second tube and a second terminal of said voltmeter;
   - (h) a bridge circuit connected at its extremities to said meter conductors and electrically bridging said voltmeter, said bridge circuit comprising a variable potentiometer, having a resistance coil and a wiping contact, and two resistors, the latter resistors and the resistance coil being connected in series;
   - (i) a first biasing circuit electrically connecting the cathodes of both said tubes with the wiping contact of said potentiometer and serially including a first bias battery connected to supply negative current to said cathodes;
   - (j) a second biasing circuit electrically connecting the anode of the first tube to the ground and serially including a second bias battery connected to supply positive current to said anode; and
   - (k) a sensing circuit electrically connecting said sensing element to the anode of the second tube and supplying a charge to the latter which will reflect the polarity and amplitude of any static charge in the atmosphere between said sensing element and said cap.

2. A portable static meter including the elements of claim 1 having resistors serially included in both said biasing circuits to limit the anode charges of the two electron discharge tubes.

3. A portable static meter including the elements of claim 1 in which the bridge resistor in the bridge circuit, which is connected to the control grid of the first tube, has a greater resistance than the other bridge resistor so as to tend to balance the inputs to the voltmeter to a zero indication.

4. A portable static meter as described in claim 1 having: a pistol-shaped housing, in which the voltmeter and batteries are carried; and a sensing-element-barrel extending forwardly from said housing in which the electron discharge tubes and the radio-active sensing element are carried, said second bias battery and said cap element being electrically grounded to said housing and said sensing element being insulated from said housing.

5. A portable static meter as described in claim 4 in which the barrel and the circuits therein are detachable from the housing and the circuits therein and having means for varying the area of said electron orifice to vary the degree of atmospheric exposure of said sensing element.

6. A portable static meter as described in claim 5 in which the sensing element comprises a metallic disc fitted into the forward extremity of said barrel and a disc of tritium foil covering the forward face of said disc.

7. A static meter as described in claim 1 in which the described circuitry causes the anodes of said first and second tubes to individually and alternately change in polarity in consequence of changes in polarity of the atmosphere enclosed between said sensing disc and said orifice cap.

References Cited

UNITED STATES PATENTS 2,782,266   2/1957   Belar _____ 330—160 XR

RUDOLPH V. ROLINEC, *Primary Examiner.*

E. L. STOLARUN, *Assistant Examiner.*

U.S. Cl. X.R.

250—49.5, 106; 324—32